United States Patent
Wu et al.

(10) Patent No.: US 10,679,352 B2
(45) Date of Patent: Jun. 9, 2020

(54) METHOD FOR AUTOMATIC SEGMENTATION OF BRAIN TUMORS MERGING FULL CONVOLUTION NEURAL NETWORKS WITH CONDITIONAL RANDOM FIELDS

(71) Applicant: Institute of Automation, Chinese Academy of Sciences, Beijing (CN)

(72) Inventors: Yihong Wu, Beijing (CN); Xiaomei Zhao, Beijing (CN)

(73) Assignee: Institute of Automation, Chinese Academy of Sciences, Beijing (CN)

( * ) Notice: Subject to any disclaimer, the term of this patent is extended or adjusted under 35 U.S.C. 154(b) by 120 days.

(21) Appl. No.: 16/070,882

(22) PCT Filed: Nov. 7, 2016

(86) PCT No.: PCT/CN2016/104849
§ 371 (c)(1),
(2) Date: Jul. 18, 2018

(87) PCT Pub. No.: WO2018/082084
PCT Pub. Date: May 11, 2018

(65) Prior Publication Data
US 2019/0026897 A1    Jan. 24, 2019

(51) Int. Cl.
*G06T 7/11* (2017.01)
*G06T 5/40* (2006.01)
(Continued)

(52) U.S. Cl.
CPC ............... *G06T 7/11* (2017.01); *G06T 5/009* (2013.01); *G06T 5/40* (2013.01); *G06T 7/136* (2017.01);
(Continued)

(58) Field of Classification Search
CPC ... G06T 7/143; G06T 7/11; G06T 5/40; G06T 7/136; G06T 5/009; G06T 11/005;
(Continued)

(56) References Cited

U.S. PATENT DOCUMENTS

2010/0027865 A1*  2/2010  Wels ..................... G06K 9/4614
                                              382/131
2012/0128224 A1*  5/2012  Yu .......................... G06T 5/002
                                              382/131

(Continued)

FOREIGN PATENT DOCUMENTS

CN    105979244 A    9/2016
CN    106600571 A    4/2017

OTHER PUBLICATIONS

Mohammad Havaei, Brain Tumor Segmentation with Deep Neural Networks, May 20, 2016, arXiv:1505.03540v3, p. 1-17. (Year: 2016).*

(Continued)

*Primary Examiner* — Brenda C Bernardi
(74) *Attorney, Agent, or Firm* — Maier & Maier, PLLC (57) ABSTRACT

A method for automatic segmentation of brain tumors merging full convolution neural networks with conditional random fields. The present application intends to address the issue that presently the technology of deep learning is unable to ensure the continuity of the segmentation result in shape and in space when segmenting brain tumors. For this purpose, the present application includes the following steps: step 1, processing a magnetic resonance image comprising brain tumors by utilizing a method for non-uniformity bias correction and brightness regularization, to generate a second magnetic resonance image; step 2, performing brain tumor segmentation for said second magnetic resonance image by utilizing a neural network merging a full convolutional neural network with a conditional random field, and (Continued)

outputting a result of brain tumor segmentation. The present method may execute brain tumor segmentation end-to-end and slice by slice during testing, which has relatively high computation efficiency.

8 Claims, 4 Drawing Sheets

(51) Int. Cl.
  *G06T 11/00* (2006.01)
  *G06T 7/136* (2017.01)
  *G06T 5/00* (2006.01)
  *G06T 7/143* (2017.01)

(52) U.S. Cl.
  CPC ............ *G06T 7/143* (2017.01); *G06T 11/005* (2013.01); *G06T 2207/10088* (2013.01); *G06T 2207/20024* (2013.01); *G06T 2207/20081* (2013.01); *G06T 2207/30016* (2013.01); *G06T 2207/30096* (2013.01)

(58) Field of Classification Search
  CPC . G06T 2207/20081; G06T 2207/10088; G06T 2207/30096; G06T 2207/20024; G06T 2207/30016
  See application file for complete search history.

(56) References Cited

U.S. PATENT DOCUMENTS

2016/0300359 A1* 10/2016 Lachner ................ G06T 7/0012
2017/0147908 A1* 5/2017 Chen ..................... G06T 7/11
2019/0362522 A1* 11/2019 Han ..................... G06T 11/00

OTHER PUBLICATIONS

Sergio Pereira, Brain Tumor Segmentation Using Convolutional Neural Networks in MRI Images, May 5, 2016, IEEE Transactions on Medical Imaging, vol. 35, No. 5, p. 1240-1251. (Year: 2016).*
Sudipta Roy, A Review on Automated Brain Tumor Detection and Segmentation from MRI of Brain, Dec. 16, 2013, arXiv:1312.6150v1, p. 1-41. (Year: 2013).*
Ali Isin, Review of MRI-based brain tumor image segmentation using deep learning methods, Aug. 29, 2016, 12th International Conference on Application of Fuzzy Systems and Soft Computing, ICAFS 2016, p. 317-324. (Year: 2016).*
International Search Report dated Aug. 11, 2017 of corresponding International Application No. PCT/CN2016/104849; 8 pgs.
Konstantinos Kamnitsas et al., "Efficient multi-scale 3D CNN with fully connected CRF for accurate brain lesion segmentation", Medical Image Analysis, Oct. 29, 2016, pp. 61-78.
Nicholas J. Tustison et al., "N4ITK: Improved N3 Bias Correction", IEEE Transactions on Medical Imaging, 29(6), Jun. 30, 2010, pp. 1310-1320.
Shuai Zheng et al., "Conditional Random Fields as Recurrent Neural Networks", 2015 IEEE International Conference on Computer Vision, Feb. 18, 2016, ISSN:2380-7504, pp. 1532-1536.
Hao Zhou et al., "Image Semantic Segmentation Based on FCN-CRF Model", 2016 International Conference on Image, Vision and Computing, Sep. 22, 2016, pp. 9-14.

* cited by examiner

METHOD FOR AUTOMATIC SEGMENTATION OF BRAIN TUMORS MERGING FULL CONVOLUTION NEURAL NETWORKS WITH CONDITIONAL RANDOM FIELDS

TECHNICAL FIELD

The present application relates to a method for image segmentation, and more particularly, to a method for automatic segmentation of brain tumors merging full convolution neural networks with conditional random fields.

BACKGROUND

The morbidity of brain tumors is relatively high, and especially for malignant lesions that children are susceptible to, brain tumor is second only to leukemia. Brain tumors, whether in a benign or malignant form, will elevate intracranial pressure, constrict brain tissues, cause damage in central nervous system, and endanger a patients' life. The location and quantization calculation (such as calculating the volume, the diameter, etc. of a tumor) for lesional tissues of brain tumors are extremely important for diagnosing brain tumors, making treatment plans, and monitoring curative effects. In clinical practice, radiologists usually segment tumors manually with a multimodal magnetic resonance image, which is a considerably tedious and time consuming job. However, with the technology of computerized automatic segmentation of brain tumors, doctors may be liberated from this job, and mistakes resulting from fatigue may be effectively avoided as well. Therefore, the technology of automatic segmentation of brain tumors has a special significance in adjuvant therapy for brain tumors. Wherein, the most common type of brain tumors is gliomas, and presently most algorithms for automatic segmentation of brain tumors are specific to gliomas. The segmentation of gliomas based on magnetic resonance images is a considerably challenging job. The difficulty thereof is embodied in the following aspects: (1) In a magnetic resonance image, gliomas and other diseases, such as gliosis, stroke, etc., may have similar appearance; (2) Gliomas may occur at any location of the brain in any shape or size, thus, little transcendental knowledge may be utilized in the process of segmentation; (3) Gliomas usually invade surrounding tissues rather than substitute them, which makes the edge of the tumor blurred in the magnetic resonance image; (4) Magnetic resonance imaging devices are imperfect, so it is inevitable that a certain extent of non-uniform brightness field will be present in a magnetic resonance image, which also raises the difficulty of brain tumor segmentation. Although it is extraordinarily hard to achieve precise automatic segmentation of brain tumors, due to the enormous significance of it in adjuvant therapy, in the past decades, numerous researchers have been attracted to devote themselves to researching it. At present, prior methods for brain tumor segmentation may be mainly divided into two types: one is based on generative models, and the other is based on discriminative models. The generative models depend on transcendent knowledge in the professional field. One of the frequently used methods for acquiring transcendent knowledge is to use brain atlas. This method registers a brain atlas onto a target image, on the basis of the image matching criterion of maximizing information, so as to obtain probability graphs of white matter, gray matter, and cerebrospinal fluid in the target image, and subsequently segmenting brain tumors using methods such as active contour, etc., in accordance with the probability graphs and other features such as texture, brightness, etc. Gooya et al. obtain a more accurate probability graph by using a tumor growth model, and further improve the precision of tumor segmentation. However, if the tumor is relatively large or the brain has been treated with resection procedure, the whole brain structure will undergo a deformation, at this point, the probability graph obtained from matching is usually not reliable.

The discriminative models generally implement tumor segmentation by extracting features of voxels, such as local histogram, texture, etc., and then classifying the voxels in accordance with the features. Classifiers, such as SVMs, random forests, etc., have all been used for brain tumor segmentation. The precision of segmentation of a discriminative model depends on the quality of manually designed features, whereas up till now, not a single feature has been found that is not only simple but also enable to provide sufficient discrimination between healthy tissues and lesional tissues.

At present, deep learning has already been successfully applied to multiple fields including automatic segmentation of brain tumors. Havaei et al. segment tumors using a convolutional neural network which has two branches and a serial structure. Pereira et al. use a technology of a plurality of convolutional layers with small convolution kernels instead of convolutional layers with large convolution kernels in a neural network for tumor segmentation and achieve prominent effect. However, presently, the technology of brain tumor segmentation based on deep learning has great difficulty in ensuring the continuity of the segmentation result in shape and in space. In order to solve this problem, it is necessary to combine deep learning with probability graph models.

SUMMARY

In order to solve the above problems in the prior art, i.e. in order to address the issue that the technology of deep learning presently is unable to ensure the continuity of the segmentation result in shape and in space when segmenting brain tumors, the present application provides a method for automatic segmentation of brain tumors merging full convolutional neural networks with conditional random fields.

The present application provides a method for automatic segmentation of brain tumors merging full convolutional neural networks with conditional random fields, which comprises the following steps:

Step 1, processing a magnetic resonance image comprising brain tumors by utilizing a method for non-uniformity bias correction and brightness regularization, to generate a second magnetic resonance image;

Step 2, performing brain tumor segmentation for said second magnetic resonance image by utilizing a neural network merging a full convolutional neural network with a conditional random field, and outputting a result of brain tumor segmentation.

In said step 1 above, said processing a magnetic resonance image comprising brain tumors comprises: step 11, using an N4ITK algorithm to perform non-uniformity field bias correction for the magnetic resonance image comprising brain tumors, and to generate a magnetic resonance image f1; step 12, performing brightness regularization processing for the magnetic resonance image f1.

Said step 12 above particularly comprises: step 121, linearly adjusting the brightness of the magnetic resonance image f1 to make its corresponding gray value fall into a preset interval of gray value, and to generate a magnetic resonance image f2; step 122, calculating a brightness histogram of said magnetic resonance image f2; step 123, performing normalization by utilizing a brightness I corresponding to the peak of the brightness histogram of said magnetic resonance image f2 and a variance of a voxel brightness of the area where the brain is located with respect to I, to generate a magnetic resonance image f3; step 124, adjusting the brightness range of said magnetic resonance image f3, to make its corresponding gray value fall within said preset interval of gray value, and to generate a magnetic resonance image f4, which is, namely, a second magnetic resonance image.

In the above method, said second magnetic resonance image comprises three modes of magnetic resonance image including Flair, T1c and T2.

In the above method, said neural network merging a full convolutional neural network with a conditional random field is a deep neural network formed after merging a full convolutional neural network with a condition random field; said conditional field is a CRF-RNN network.

In the above method, said full convolutional neural network is a convolutional neural network with serial structure, which is constructed by a first convolutional neural network and a second convolutional neural network in series, said full convolutional neural network has a first dimension input and a second dimension input, in particular: the first dimension input generates an eigen image through a first convolutional neural network, and said eigen image is combined with said second dimension input to serve as an input of the second convolutional neural network; said eigen image has the same size as said second dimension input.

In the above method, steps for brain tumor segmentation of said second magnetic resonance image comprise: step 21, sequentially acquiring each axial slice of the three modes of images for the second magnetic resonance image; the size of said axial slice is w*h*3, data of the 3 channels are acquired in sequence from Flair, T1c, and T2; step 22, proceeding with adjacent zero padding operation for the axial slice acquired in step 21, to generate pictures of two sizes, (w+64)*(h+64)*3 and (w+32)*(h+32)*3; step 23, inputting the pictures generated after zero padding operation into the neural network merging a full convolutional neural network with a conditional random field for brain tumor segmentation, and outputting the resulting picture of brain tumor segmentation.

In the above method, said neural network merging a full convolutional neural network with a conditional random field is proceeded with parameter training by following steps: step S1, a patch acquired from the axial slice of the second magnetic resonance image is used to train the full convolutional neural network; said patch acquired from the axial slice of the second magnetic resonance image is, in particular, a square patch centering on a specific pixel on the three modes of magnetic resonance image, including Flair, T1c, and T2, wherein the category label of the patch is the label of this pixel; step S2, using the axial slice acquired from the magnetic resonance image to input into the full convolutional neural network well trained in step S1 and use the output of the full convolutional neural network as the input of the conditional random field, the result of tumor segmentation for this axial slice will be output by the conditional random field, said result will be compared with a truth-value image and a softmax loss will be calculated, and subsequently, network parameters of the conditional random field are trained with error back propagation, wherein parameters of the full convolutional neural network are constant in this step; step S3, use the axial slice acquired from the magnetic resonance image to perform parameter optimization for the neural network merging a full convolutional neural network with a conditional random field.

In the above method, after the result of brain tumor segmentation is output in step 2, a step of screening out the result of brain tumor segmentation is further comprised, which is executed, in particular, by filtering out regions of small tumor and by means of a threshold filtering method.

Further, said threshold filtering method is: in the corresponding result of brain tumor segmentation for three modes of magnetic resonance image, including Flair, T1c, and T2, if, in the result of segmentation, $V_{Flair}(x,y,z)<0.8*Mean_{Flair}$, $V_{T1c}(x,y,z)<125$, $V_{T2}(x,y,z)<0.9*Mean_{T2}$, and $Result(x,y,z)<4$, then set $Result(x,y,z)=0$; if, in the result of segmentation, $vol_e/vol_t<0.05$, $V_{T1c}(x,y,z)-85$, and $Result(x,y,z)=2$, then set $Result(x,y,z)=3$; if $V_{T1c}(x,y,z)<100$, and $Result(x,y,z)=4$, then set $Result(x,y,z)=1$, wherein $V_{Flair}$, $V_{T1c}$, and $V_{T2}$ represent a Flair mode, a T1c mode, and a T2 mode of second magnetic resonance image, respectively; Result represents the result of brain tumor segmentation; $Mean_{Flair}$ and $Mean_{T2}$ represent an average brightness of total regions of tumor including edema shown in Result at the corresponding position of the Flair mode and the T2 mode of second magnetic resonance image respectively; $vol_e$ represents a volume of enhanced core in Result; $vol_t$ represents a total volume of tumors including edema in Result; (x,y,z) represents a voxel; and $Result(x,y,z)=0,1,2,3,4$ sequentially indicates that the voxel (x,y,z) is labeled as healthy tissue, necrosis, edema, non-enhanced core, enhanced core.

In conclusion, the method of the present application for automatic segmentation of brain tumors merging full convolutional neural networks with conditional random fields uses a model of conditional random field which is implemented in the form of neural network and merging it with a full convolutional neural network, so as to address the issue that a deep learning model of brain tumor segmentation is unable to ensure the continuity of segmentation result in appearance and in space. Moreover, the testing result of the present application on BRATS 2013 Challenge dataset currently ranks second, and the testing result of the present application on BRATS 2013 Leader Board dataset currently ranks first. Compared to the method ranks first in Challenge: the present method may proceed with brain tumor segmentation end-to-end and slice by slice during testing, which has a higher computation efficiency. In addition, the present application only uses three modes of magnetic resonance image, including Flair, T1c and T2, for tumor segmentation, rather than 4 modes, namely, Flair, T1, T1c, and T2, and further reduces the cost of data collection and storage to a certain extent.

BRIEF DESCRIPTION OF DRAWINGS

FIG. 6 is a diagram of part of the segmentation result on the BRATS 2013 Challenge dataset using the method according to the present application (in each row of the figure, from left to right sequentially is: Flair, T1c, T2, diagram of the segmentation result of a full convolutional neural network, diagram of the segmentation result of a full convolutional neural network+CRF, diagram of the segmentation result of a full convolutional neural network+ CRF +post processing, where the first row and the second row are in sequence data of the $50^{th}$ layer and of the $80^{th}$ layer in axial direction of data No. 0301, the third row and the fourth row are in sequence data of the $40^{th}$ layer and of the $70^{th}$ layer in axial direction of data No. 0308, gray value in the resulting diagram from low to high sequentially represent healthy, necrosis, edema, non-enhanced core, enhanced core).

DETAILED DESCRIPTION

The preferred embodiments of the present application are described hereinafter with reference to the accompanying drawings. It should be understood by those skilled in the art that these embodiments are merely used for explaining the technical principles of the present application, rather than intending to limit the scope of the present application. For example, although various steps of the method of the application are described in particular orders, these orders are not restrictive, and those skilled in the art may executing said steps in different orders, without departing from the fundamental principles of the application.

Figure 1:
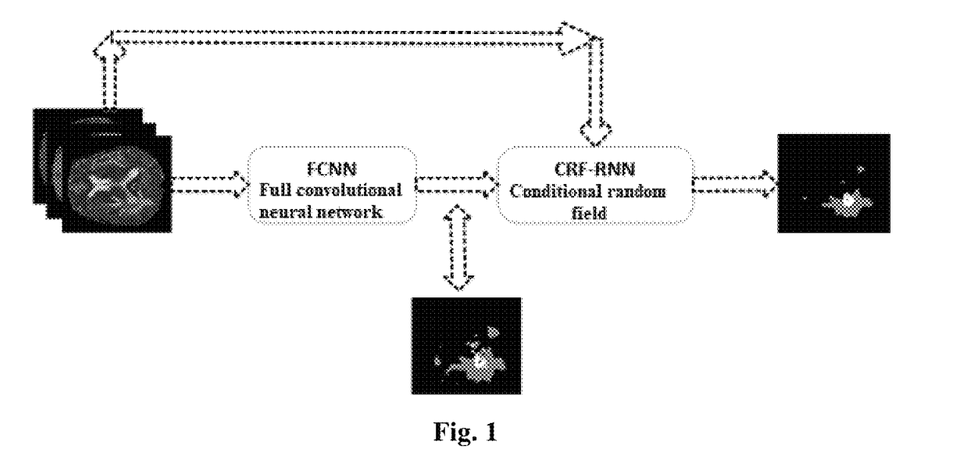
FIG. 1 is a schematic diagram of a brain tumor segmentation model of the method for automatic segmentation of brain tumors merging full convolutional neural networks with conditional random fields according to the present application.
Figure 2:
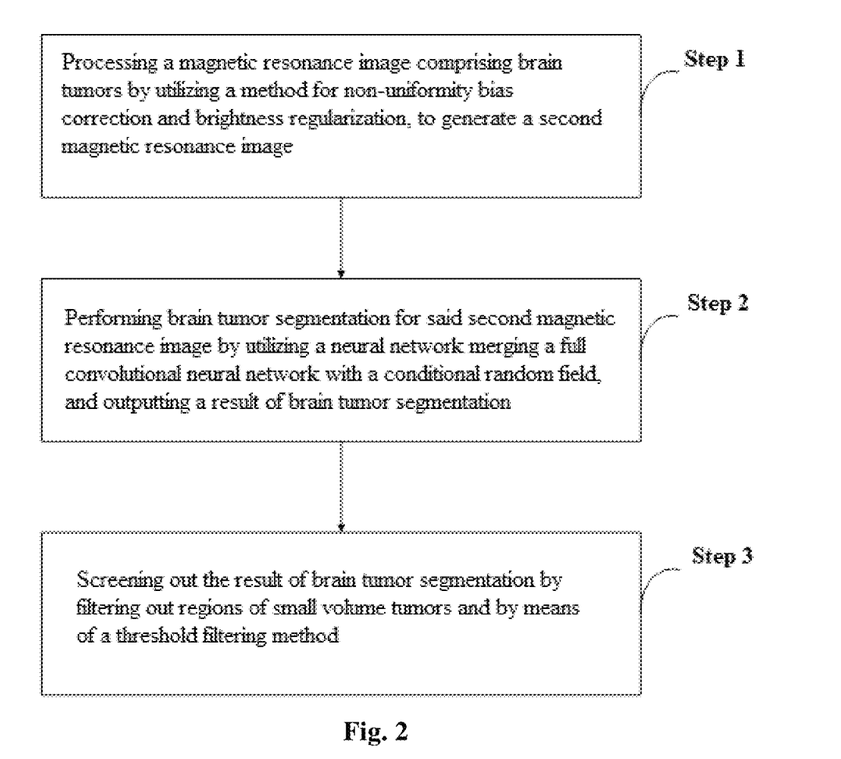
FIG. 2 is a flowchart of the method for automatic segmentation of brain tumors merging full convolutional neural networks with conditional random fields according to the present application.

First, referring to FIG. 1, FIG. 1 is a schematic diagram of the brain tumor segmentation model of the method for automatic segmentation of brain tumors merging full convolutional neural networks with conditional random fields. The present application uses a method merging a conditional random field model with a full convolutional neural network implemented by a neural network to address the issue that the brain tumor segmentation technology based on deep learning is presently hard to ensure the continuity of segmentation result in appearance and in space, which has a faster segmentation speed and a higher segmentation accuracy. In this embodiment, in the brain tumor segmentation model, as shown in FIG. 1, the conditional random field utilizes a CRF-RNN (Conditional Random Fields as Recurrent Neural Networks), which forms one deep neural network after merging with a FCNN full convolutional neural network. The specific steps of the present application are illustrated in detail hereinafter, as shown in FIG. 2, the present application comprises the following steps:

Step 1, preprocessing of a magnetic resonance image: utilizing a method for non-uniformity bias correction and brightness regularization, for processing a magnetic resonance image comprising brain tumor images and generating a second magnetic resonance image;

Step 2, brain tumor segmentation: utilizing a neural network merging a full convolutional neural network with a conditional random field, for segmenting brain tumors of said second magnetic resonance image, and outputting the result of brain tumor segmentation;

Step 3, post processing of segmentation result: screening out the result of brain tumor segmentation by filtering out regions of small volume tumors and by means of a threshold filtering method.

1. Preprocessing of a Magnetic Resonance Image

In this step, the step of processing a magnetic resonance image comprising brain tumor images comprises:

Step 11, using an N4ITK algorithm to execute non-uniformity field bias correction for the magnetic resonance image comprising brain tumor images, and to generate a magnetic resonance image f1;

Step 12, proceeding with brightness regularization processing for the magnetic resonance image f1.

The N4ITK algorithm is an algorithm of non-uniformity bias correction, which may be implemented by directly using prior software, such as ANTS. In regard to the N4ITK algorithm, "Nicholas J. Tustisom, Brian B. Avants. N4ITK: Improved N3 Bias Correction. IEEE TRANSACTIONS ON MEDICAL IMAGING, VOL. 29, NO. 6, JUNE 2010" may be referred to, and it will no longer be described in details herein. The purpose of executing non-uniformity correction for the magnetic resonance image comprising brain tumor images is to eliminate field bias in the magnetic resonance image, and to try to make identical absolute brightness in the same magnetic resonance image have identical physical significance.

In step 12 of this embodiment, brightness regularization processing is implemented by subtracting the corresponding brightness value of the peak value of brightness histogram and then dividing by the "variance", the "variance" used herein is the variance of the corresponding brightness value with respect to the peak value of brightness histogram, instead of the generally used variance with respect to the mean value of brightness. The purpose for executing brightness regularization processing for magnetic resonance images is to try to make identical absolute brightness in different magnetic resonance images have identical physical significance. In particular, step 12 comprises the following steps:

Step 121, linearly adjusting the brightness of magnetic resonance image f1, to make its corresponding gray value fall within a preset interval of gray value, and to generate a magnetic resonance image f2. In this embodiment, the magnetic resonance image is demonstrated and processed in the manner of an ordinary picture for convenience, and the brightness of the magnetic resonance image is adjusted to a gray level within a range of 0-255. Namely, the range of the gray value of the brightness of magnetic resonance image f1 is linearly adjusted to be between 0-255, when executing brightness regularization processing for magnetic resonance image f1. Assume that the size of magnetic resonance image f1 is $L*W*H$, wherein the brightness of each voxel is represented as $f1(x,y,z)$, $1 \leq x \leq L$, $1 \leq y \leq W$, $1 \leq z \leq H$, variables x, y, z are positive integers, and the generated magnetic resonance image f2 may be represented as the following equation:

$$f2(x,y,z)=f1(x,y,z)\times 255/\max(f1), \forall x\in[1,L], \forall y\in[1,W], \forall z\in[1,H]$$

Wherein f2(x,y,z) represents the brightness of the voxel (x,y,z) after the range of brightness has been linearly adjusted, and max(f1) represents the maximum value of brightness in f1.

Step 122, calculating the brightness histogram of magnetic resonance image f2. In step 122, the brightness histogram illustrates the number of voxels for each brightness in the image, which reflects the frequency of occurrence for each brightness in the image. The brightness may be divided into 256 levels when calculating the brightness histogram, at this point, the brightness histogram may be represented as a one dimensional array hist(k) of length 256, k=1, 2, . . . , 256. The procedure of calculation of the brightness histogram is as follows: (1) initialization: hist(k)=0, k=1, 2, . . . , 256. (2) statistics: traversing all of the voxels (x,y,z) in the image, if (k−1)≤f2(x,y,z)<k, hist(k)=hist(k)+1.

Step 123, executing normalization for magnetic resonance image f2 by utilizing a corresponding brightness I at the peak value of the brightness histogram of magnetic resonance image f2 and a variance σ of the voxel brightness of the area where the brain is located with respect to I, to generate a magnetic resonance image f3. In step 123, assuming that the voxel brightness of the area where the brain is located is not 0, the magnetic resonance image f3 may be calculated with the following approach: if f2(x,y,z)=0, then f3(x,y,z)=0; if f2(x,y,z)≠0, then f3(x,y,z)= (f2(x,y,z)−I)/σ.

In this embodiment, the detailed procedure for calculating brightness I is that: the brightness I is a corresponding brightness at the peak value of brightness histogram of the magnetic resonance image f2, where I may be estimated in the following manner let I equal to the average of k1*, k2*, k3*, . . . k10*, where kn* (n=1, 2, 3, . . . , 10) are the nth maximum value in hist(k) other than hist(1), respectively, wherein k=1, 2, . . . 256.

In this embodiment, the procedure for calculating the variance σ is as follows: (1) Initializing S=0, N=0, where S is used for calculating the sum of squares of the difference between the voxel brightness in the area where the brain is located and I, N is used for collecting statistics of the number of voxels in the area where the brain is located. (2) traversing all of the voxels (x,y,z) in the image, if f2(x,y,z)≠0, S=S+(f2(x,y,z)−I)$^2$, N=N+1. (3) σ=$\sqrt{S/N}$, wherein there is a great number of non-brain blank space at the periphery of the magnetic resonance image, which do not participate in calculating the variance σ.

Step 124, adjusting the range of brightness of the magnetic resonance image f3, to make its corresponding gray value fall within a preset interval of gray value, and to generate a magnetic resonance image f4, which is namely a second magnetic resonance image. Specifically, if f3(x,y,z)=0, then f4(x,y,z)=0; if f3(x,y,z)≠0, f4(x,y,z)=(f2(x,y,z)+I$_0$)×σ$_0$, then make the range of brightness of the image back to be within the interval of 0-255 again. If f4(x,y,z)<0, then set f4(x,y,z)=0; if f4(x,y,z)>255, then set f4(x,y,z)=255. The magnetic resonance image f4 is namely the second magnetic resonance image. In this embodiment, for the three modes of magnetic resonance image, including Flair, T1c, and T2, the value of σ$_0$ is 30, 31, and 37 respectively, and the value of I$_0$ is 75, 99, and 55 respectively.

It should be noted that, hereinbefore, the second magnetic resonance image comprises three modes of magnetic resonance images, including Flair, T1c, and T2, wherein Flair is fluid attenuated inversion recovery sequence of magnetic resonance imaging; T1c is contrast-enhanced T1-weighted imaging which highlights the vertical relaxation difference of tissues; T2 is T2-weighted imaging which highlights the horizontal relaxation difference of tissues. In the present application, brain tumors are segmented in accordance with the three modes of magnetic resonance image, including Flair, T1c and T2, and a brain tumor generally shows different signal characteristics in different modes of magnetic resonance image, for example, a brain tumor generally presents a high signal in Flair and T2, a tumor enhanced core generally presents a high signal in T1c, a necrosis generally presents a low signal in T1c. The information provided in different modes of magnetic resonance image may complement each other, simultaneously using multiple modes of images is more beneficial to obtaining a precise segmentation of tumors.

Figure 3:
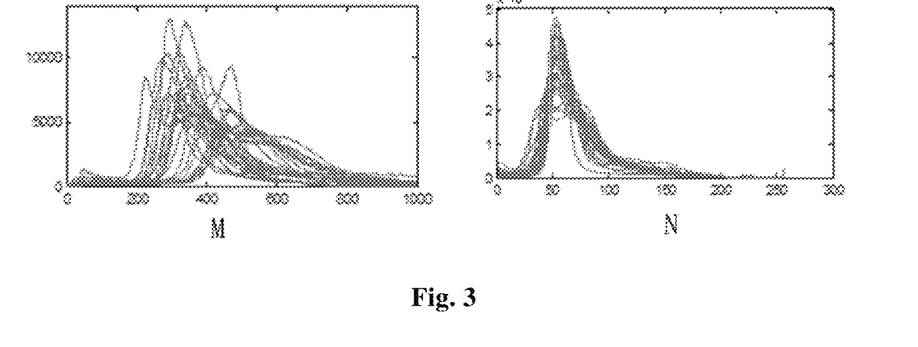
FIG. 3 is a comparison diagram of brightness histograms of 30 magnetic resonance images prior and posterior to brightness regularization processing of the method for automatic segmentation of brain tumors merging full convolutional neural networks with conditional random fields according to the present application (using the T2 mode of magnetic resonance image as an example, wherein M is prior to the brightness regularization; N is posterior to the brightness regularization)
Figure 4:
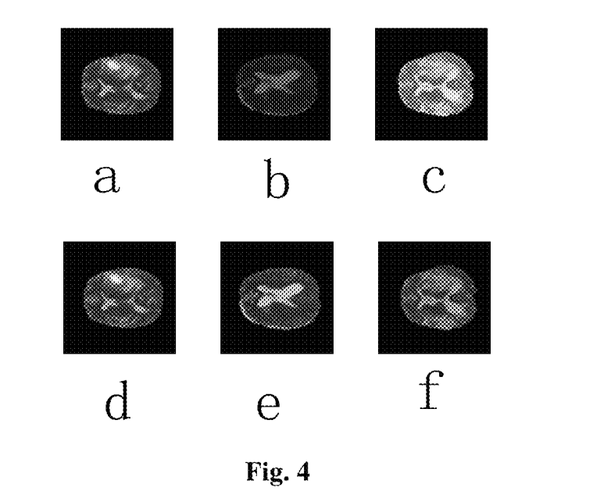
FIG. 4 is a comparison diagram of effects prior and posterior to brightness regularization processing of the method for automatic segmentation of brain tumors merging full convolutional neural networks with conditional random fields according to the present application (using the T2 mode of magnetic resonance image as an example, wherein a, b, c represent each of the images prior to brightness regularization respectively, d, e, f represent each of the images corresponding to a, b, c posterior to brightness regularization respectively)

Referring to FIG. 3 and FIG. 4, using the T2 mode of magnetic resonance image as an example, FIG. 3 is a comparison diagram of brightness histogram of 30 magnetic resonance images prior and posterior to brightness regularization processing of the method of the present application for automatic segmentation of brain tumors merging full convolutional neural networks and conditional random fields (wherein M is prior to brightness regularization; N is posterior to brightness regularization). FIG. 4 is a comparison diagram of effects prior and posterior to the brightness regularization processing of the method of the present application for automatic segmentation of brain tumors merging full convolutional neural networks with conditional random fields (wherein, a, b, c represent each of the images prior to the brightness regularization respectively, and d, e, f represent each of the images corresponding to a, b, c posterior to brightness regularization respectively). It could be seen from FIG. 3 and FIG. 4 that the method hereinbefore for brightness regularization processing of magnetic resonance images comprising brain tumor images is able to ensure that identical absolute brightness in different images has identical physical significance as far as possible under the circumstances that the shape of histogram is constant. The magnetic resonance images in FIG. 3 and FIG. 4 are images after proceeded with non-uniformity field correction.

2. Brain Tumor Segmentation

Figure 5:
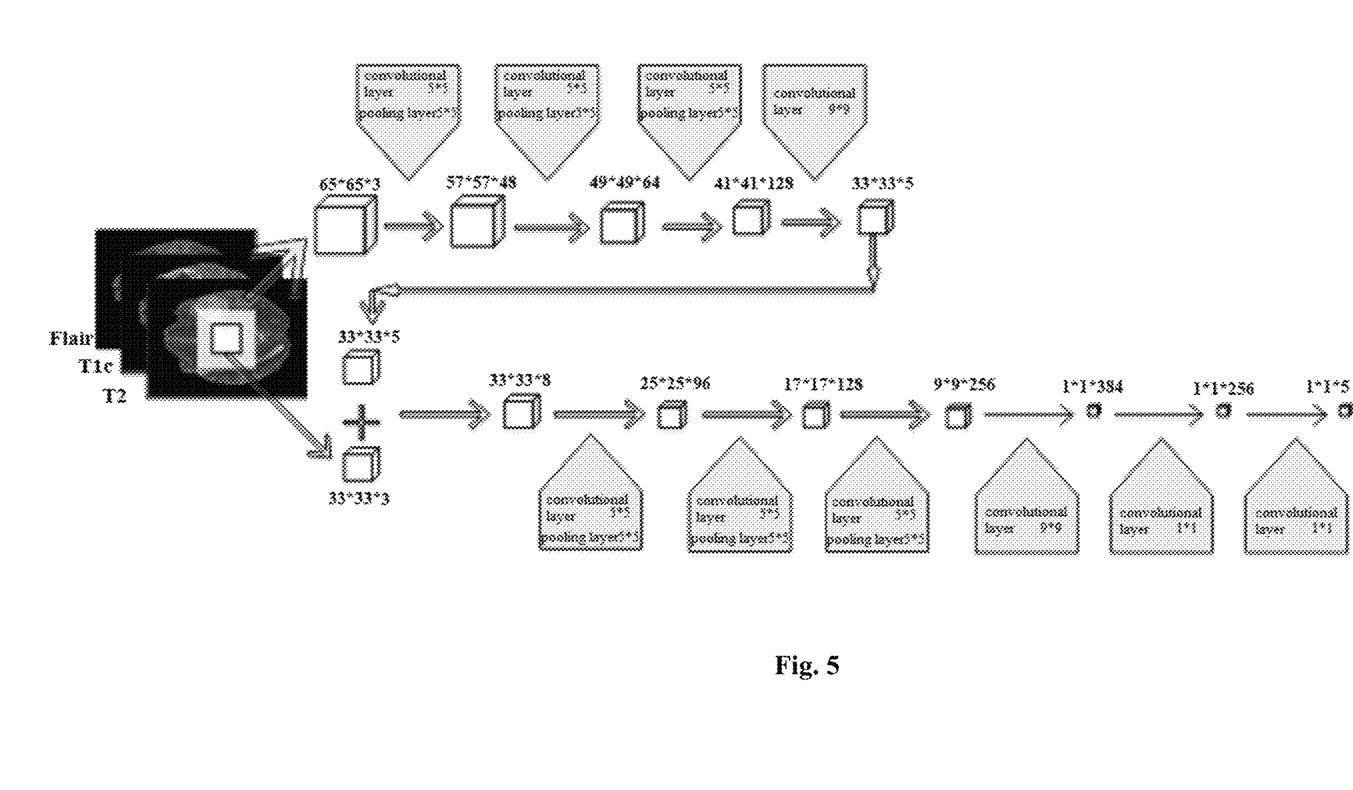
FIG. 5 is a structural diagram of the full convolutional neural network of the method for automatic segmentation for brain tumors merging full convolutional neural networks with conditional random fields according to the present application.
Figure 6:
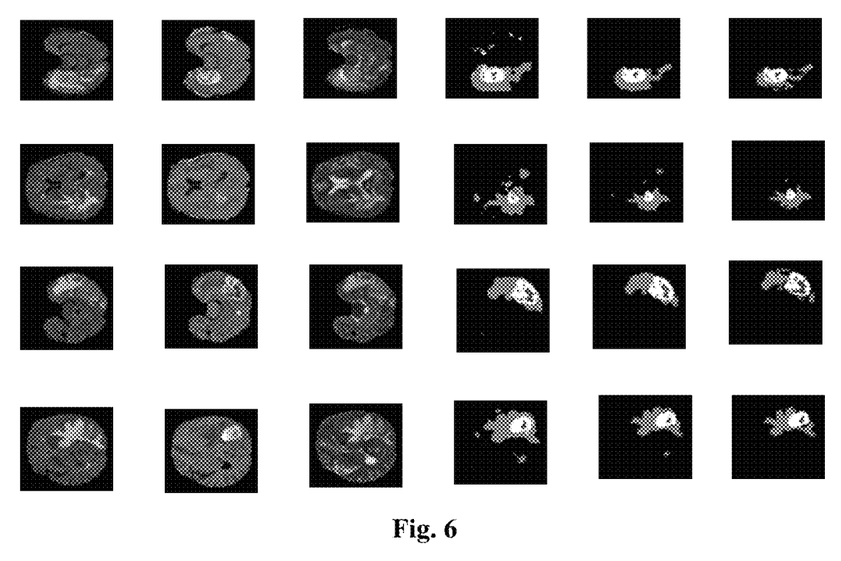

Referring to FIG. 5, in step 2, a full convolutional neural network is a convolutional neural network with a serial structure, which is constructed by a first convolutional neural network and a second convolutional neural network in series, and the input of which has two dimensions, respectively being a first dimension input and a second dimension input, wherein the first dimension input generates an eigen image which has the same size as the second dimension input through the first convolutional neural network, combining said eigen image with said second dimension input to serve as the input of the second convolutional neural network.

In step 2, the conditional random field partially refers to the CRF-RNN (Conditional Random Fields as Recurrent Neural Networks) network presented by Shuai Zheng et al. The CRF-RNN uses RNN to implement a conditional random field, which makes it possible for the conditional random field to be merged with a full convolutional neural network into one deep learning network, rather than using the conditional random field as one of the post processing steps of a deep learning segmentation model. A CRF-RNN network may use a traditional back-propagating algorithm to train.

In step 2, particularly, the neural network merging a full convolutional neural network with a conditional random field may be proceeded with parameter training according to the following steps:

Step S1, using a square patch acquired from the axial slice of the second magnetic resonance image for training the full convolutional neural network; said square patch acquired from the axial slice of the second magnetic resonance constructs a training sample of this stage, in particular, being a square patch centering on a particular pixel on three modes of magnetic resonance images, including Flair, T1c, and T2, which comprises two parts of different sizes, the size of one part being 65*65*3, the size of the other part being 33*33*3, data of the three channels are sequentially acquired from axial slices in Flair, T1c, and T2. The center pixels of two parts of data have the same coordinate, under which, values in a truth-value image is used as a label of this sample. Referring to FIG. 5, FIG. 5 is a structural diagram of the full convolutional neural network of the method for automatic segmentation of brain tumors merging full convolutional neural networks with conditional random fields. The training stage labeled in the figure inputs the size of the image of training sample and the size of each layer of eigen image. As shown in FIG. 5, in this embodiment, the training stage of a full convolutional neural network uses a square patch of 65*65*3 acquired from the axial slice of the second magnetic resonance as the input of the first dimension, and an eigen image of 33*33*5 is obtained after passed through the first convolutional neural network. A square patch of 33*33*3 acquired from the axial slice of the second magnetic resonance image is used as the input of the second dimension. Combining the eigen image of 33*33*5 with the square patch of 33*33*3 to obtain an image of 33*33*8, which is used as the input of the second convolutional neural network and sequentially passes through a convolutional layer and a pooling layer. As shown in FIG. 5, the last three layers of said full convolutional neural network simulate a full connect layer using a convolutional layer of size 9*9, 1*1, and 1*1 respectively, wherein a step size of each layer is set to 1. In this training stage, one training sample is input and a vector of 1*1*5 is ultimately obtained, wherein each of the elements in the vector sequentially indicates the estimated value for the probability of the central pixel of the input square patch belonging to healthy tissue, necrosis, edema, non-enhanced core and enhanced core, by said full convolutional network. Said estimated value will be used for calculation of the softmax loss function, and an error back-propagating algorithm is used for training the parameters of the entire full convolutional network.

It should be noted that, the training samples are acquired by way of randomly sampling on training data, and it is necessary to control the size of 5 types of training samples to be identical. In this stage, a patch acquired from axial slice is used for training the network. On one hand, the size of training samples may be increased exponentially, on the other hand, it is also convenient for controlling the size of different types of sample, beneficial to achieving sample balance. In addition, said network is a full convolutional network, although smaller patches are used for training, testing may be performed slice by slice, and hence the testing speed is improved.

Step S2, using an axial slice acquired from the second magnetic resonance image for training a conditional random field network. Specific description is as follows, assuming that the size of the axial slice is w*h*3, data of the 3 channels are acquired from Flair, T1c, and T2 in sequence, respectively. First proceeding with adjacent zero padding operation for the axial slice, to generate pictures of two sizes, (w+64)*(h+64)*3 and (w+32)*(h+32)*3, which will be used as a first dimension input and a second dimension input of the full convolutional neural network respectively. An image with a size of w*h*5 of a preliminary segmentation result of brain tumors will be output by the full convolutional neural network will output, said resulting image is input into the following conditional random field network for further processing. An optimized image with a size of w*h*5 of segmentation result of brain tumors is output by the conditional random field network, which will be compared with a truth-value image of brain tumor segmentation, and a softmax loss will be calculated, and subsequently, network parameters of the conditional random field are trained with error back-propagation. In this stage, parameters of the full convolutional neural network are constant, and only network parameters of the conditional random field is trained;

Step S3, use the axial slice acquired from the magnetic resonance image to perform parameter optimization for the neural network merging a full convolutional neural network with a conditional random field. The particular procedures are the similar with those of step S2, except that the network parameters of the full convolutional neural network and the conditional random field are tuned simultaneously in the error back-propagation stage.

In step 2, the tumor segmentation is executed particularly by the following steps: First, sequentially acquiring each axial slice of a magnetic resonance image to be segmented, assuming the size of the axial slice is w*h*3, data of the 3 channels are acquired from Flair, T1c, and T2 in sequence. Then, executing adjacent zero padding operation for the axial slice, to generate two sizes of pictures, (w+64)*(h+64)*3 and (w+32) *(h+32) *3, which will be used as a first dimension input and a second dimension input respectively. After passing through the full convolutional neural network and the conditional random field network, an image with the size of w*h*5 of the segmentation result of brain tumors is output. The step of said stage is similar to step S2 and step S3, except that there is no error back-propagation procedure like step S2 and step S3

3. Post Processing of Segmentation Result

The post processing of segmentation result are added after outputting the segmentation result of brain tumors in step 2, in order to further improve the precise of segmentation of brain tumors. Steps of screening out the segmentation result of brain tumors are described in detail below.

In the explanation of steps of screening out the segmentation result of brain tumors, $V_{Flair}$, $V_{T1c}$, and $V_{T2}$ represent a Flair mode, a T1c mode, and a T2 mode of second magnetic resonance image posterior to non-uniformity bias correction and brightness regularization processing, respectively; Result represents the result of brain tumor segmentation. Steps for screening out segmentation result of brain tumors comprise: Step S31, Initializing Result using the segmentation result of a segmentation network merging a full convolutional neural network with a conditional random field.

Step 32, if $Mean_{Flair}(n)>150$ and $Mean_{T2}(n)>150$, then deleting the nth three-dimensional connective tumor region in Result, wherein $Mean_{Flair}(n)$ represents a mean value of voxel brightness of the nth three-dimensional connective tumor region including edema in corresponding region of $V_{Flair}$, $Mean_{T2}(n)$ represents a mean value of voxel brightness of the nth three-dimensional connective tumor region including edema in corresponding region of $V_{T2}$. Because after been proceeded with un-uniformity bias correction and brightness regularization processing, a regional highlight like this is usually caused by imaging abnormal, rather than tumor.

Step 33, if a voxel (x,y,z) satisfies the following conditions at the same time:
(1) $V_{Flair}(x,y,z)<0.8*Mean_{Flair}$; (2) $V_{T1c}(x,y,z)<125$; (3) $V_{T2}(x,y,z)<0.9*Mean_{T2}$; (4) Result(x,y,z)<4, then set Result(x,y,z)=0, wherein $Mean_{Flair}$ represents a mean value of voxel brightness of total tumor region including edema in corresponding region of $V_{Flair}$, $Mean_{T2}$ represents a mean value of voxel brightness of total tumor region including edema in corresponding region of $V_{T2}$, Result(x,y,z)=0,1,2,3,4 sequentially indicates that the voxel (x,y,z) is labeled as healthy tissue, necrosis, edema, non-enhanced core, enhanced core. If a voxel shows a low signal or an equisignal on Flair, T1c and T2 at the same time, then the probability of said voxel being healthy tissue is larger.

Step 34, if volume(n)/$Volume_{max}$<0.1, then deleting the nth three-dimensional connective tumor region in Result, wherein volume(n) represents the volume of the nth three-dimensional connective tumor region in the tumor region shown in current Result, and $Volume_{max}$ represents the maximum value of these volumes.

Step 35, filling up the holes in Result. Fills up blank regions in the tumor regions in Result as necrosis.

Step 36, if, in the result of segmentation, $vol_e/vol_t<0.05$, for voxels satisfies $V_{T1c}(x,y,z)<85$, and Result(x,y,z)=2, then set Result(x,y,z)=3, wherein $vol_e$ represents a volume of enhanced core in Result; and $vol_t$ represents a total volume of tumors including edema in Result. When the volume of enhanced core is considerably small, the volume of non-enhanced core is usually larger, and under this circumstance, the method of the application excessively tends to misclassify the non-enhanced core as edemas. In this step, part of the misclassifications may be corrected with a simple threshold method.

Step 37, if $V_{T1c}(x,y,z)<100$, and Result(x,y,z)=4, then set Result(x,y,z)=1. A mistaken classification as partial necrosis for the enhanced core easily occurs, and can be corrected by a simple threshold method in this step.

In conclusion, the method for automatic segmentation of brain tumors merging full convolutional neural networks with conditional random fields according to the present application uses a model of conditional random field which is implemented in the form of neural network and merging it with a full convolutional neural network, so as to address the issue that a deep learning model of brain tumor segmentation is unable to ensure the continuity of segmentation result in appearance and in space. Moreover, the testing result of the present application on BRATS 2013 Challenge dataset currently ranks second, and the testing result of the present application on BRATS 2013 Leader Board dataset currently ranks first. Compared to the method ranks first in Challenge: the present method may proceed with brain tumor segmentation end-to-end and slice by slice during testing, which has relatively high computation efficiency. In addition, the present application only uses three modes of magnetic resonance images, including Flair, T1c and T2, for tumor segmentation, rather than 4 modes, namely, Flair, T1, T1c, and T2, and further reduces the cost of data collection and storage to a certain extent.

It should be realized by those skilled in the art that, the modules, units and steps of methods in various examples described with reference to the embodiments disclosed herein may be implemented with electronic hardware, computer software of a combination thereof. In order to set forth the interchangeability between electronic hardware and software, the constitutions and steps of each example has been generally described according to functions in the explanations above. Whether to execute these functions in the manner of electronic hardware or software is depended on specific applications of the technical solution and constraint condition of the design. Those skilled in the art may implement the described functions using different methods for each of the particular applications. Hereto, the technical solution of the present application has been described with reference to the preferred embodiments shown in the appendant drawings, however, it should be easy for those skilled in the art to understand that, the scope of the application is obviously not limited to these particular embodiments. Equivalent changes or alternations may be made to relevant technical features by those skilled in the art, without departing from the principle of the application. All of the technical solutions posterior to these changes or alternations will fall within the scope of the application.

What is claimed is:

1. A method for automatic segmentation of brain tumors merging full convolutional neural networks with conditional random fields, comprising the following steps:
    Step 1, processing a magnetic resonance image comprising brain tumors by utilizing a method for non-uniformity bias correction and brightness regularization, to generate a second magnetic resonance image; and
    Step 2, performing brain tumor segmentation for said second magnetic resonance image by utilizing a neural network merging a full convolutional neural network with a conditional random field, and outputting a result of brain tumor segmentation,
    wherein said processing a magnetic resonance image comprising brain tumors in step 1 comprises:
    Step 11, using an N4ITK algorithm to execute non-uniformity field bias correction for the magnetic resonance image comprising brain tumors, to generate a magnetic resonance image f1;
    Step 12, performing a brightness regularization processing for the magnetic resonance image f1;
    wherein step 12 particularly comprises:
    Step 121, linearly adjusting the brightness of the magnetic resonance image f1 to make its corresponding gray value fall into a preset interval of gray value, to generate a magnetic resonance image f2;
    Step 122, calculating a brightness histogram of said magnetic resonance image f2;
    Step 123, performing normalization by utilizing a brightness I corresponding to the peak of the brightness histogram of said magnetic resonance image f2 and a variance of a voxel brightness of the area where the brain is located with respect to I;
    Step 124, adjusting the brightness range of said magnetic resonance image f3, to make its corresponding gray value fall within said preset interval of gray value, to generate a magnetic resonance image f4, which is said second magnetic resonance image.

2. The method according to claim 1, wherein said second magnetic resonance image comprises three modes of magnetic resonance image: Flair, T1c and T2.

3. The method according to claim 1, wherein said neural network merging a full convolutional neural network with a conditional random field is a deep neural network formed after merging a full convolutional neural network with a conditional random field, and said conditional field is a CRF-RNN network.

4. The method according to claim 3, wherein said full convolutional neural network is a convolutional neural network with serial structure, which is constructed by a first convolutional neural network and a second convolutional neural network in series, said full convolutional neural network has a first dimension input and a second dimension input, wherein:
the first dimension input generates an eigen image through a first convolutional neural network, and said eigen image is combined with said second dimension input to serve as an input of the second convolutional neural network; and said eigen image has the same size as said second dimension input.

5. The method according to claim 1, wherein steps for brain tumor segmentation of said second magnetic resonance image comprise:
Step 21, sequentially acquiring each axial slice of the three modes of images for the second magnetic resonance image; the size of said axial slice is w*h*3, data of the 3 channels are acquired in sequence from Flair, T1c, and T2;
Step 22, proceeding with adjacent zero padding operation for the axial slice acquired in step 21, to generate pictures of two sizes, (w+64)*(h+64)*3 and (w+32)*(h+32)*3; and
Step 23, inputting the pictures generated after zero padding operation into the neural network merging a full convolutional neural network with a conditional random field for brain tumor segmentation, and outputting the resulting picture of brain tumor segmentation.

6. The method according to claim 5, wherein said neural network merging a full convolutional neural network with a conditional random field is proceeded with parameter training by following steps:
Step S1, a patch acquired from the axial slice of the second magnetic resonance image is used to train the full convolutional neural network; said patch acquired from the axial slice of the second magnetic resonance image is a square patch centering on a specific pixel on the three modes of magnetic resonance image, Flair, T1c, and T2, wherein the category label of the patch is the label of this pixel;

Step S2, using the axial slice acquired from the magnetic resonance image to input into the full convolutional neural network well trained in step S1 and use the output of the full convolutional neural network as the input of the conditional random field, the result of tumor segmentation for this axial slice will be output by the conditional random field, said result will be compared with a truth value image and a softmax loss will be calculated, and subsequently, network parameters of the conditional random field are trained with error back propagation, wherein parameters of the full convolutional neural network are constant in this step; and
Step S3, using the axial slice acquired from the magnetic resonance image to perform parameter optimization for the neural network merging a full convolutional neural network with a conditional random field.

7. The method according to claim 1, wherein after the result of brain tumor segmentation is output in step 2, said method further comprises a step of screening out the result of brain tumor segmentation, which is executed, in particular, by filtering out regions of small tumor and by means of a threshold filtering method.

8. The method according to claim 7, wherein said threshold filtering method is:
in the corresponding result of brain tumor segmentation for three modes of magnetic resonance image, Flair, T1c, and T2,
if, in the result of segmentation, $V_{Flair}(x,y,z) < 0.8*Mean_{Flair}$, $V_{T1c}(x,y,z) < 125$, $V_{T2}(x,y,z) < 0.9*Mean_{T2}$, and Result(x,y,z)<4, then set Result(x,y,z)=0;
if, in the result of segmentation, $vol_e/vol_t < 0.05$, $V_{T1c}(x,y,z) < 85$, and Result(x,y,z)=2, then set Result(x,y,z)=3;
if $V_{T1c}(x,y,z) < 100$, and Result(x,y,z)=4, then set Result(x,y,z)=1;
wherein $V_{Flair}$, $V_{T1c}$, and $V_{T2}$ represent a Flair mode, a T1c mode, and a T2 mode of second magnetic resonance image, respectively; Result represents the result of brain tumor segmentation; $Mean_{Flair}$ and $Mean_{T2}$ represent an average brightness of total regions of tumor including edema shown in Result at the corresponding position of the Flair mode and the T2 mode of second magnetic resonance image respectively; $vol_e$ represents a volume of enhanced core in Result; $vol_t$ represents a total volume of tumors including edema in Result; (x,y,z) represents a voxel; and Result(x,y,z)=0, 1,2,3,4 sequentially indicates that the voxel (x,y,z) is labeled as healthy tissue, necrosis, edema, non-enhanced core, enhanced core.

* * * * *